US010609122B1

(12) United States Patent
Argenti et al.

(10) Patent No.: US 10,609,122 B1
(45) Date of Patent: Mar. 31, 2020

(54) INSTANCE BACKED BUILDING OR PLACE

(71) Applicant: Amazon Technologies, Inc., Seattle, WA (US)

(72) Inventors: Marco Argenti, Mercer Island, WA (US); Khawaja Salman Shams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 512 days.

(21) Appl. No.: 14/754,613

(22) Filed: Jun. 29, 2015

(51) Int. Cl.
*H04L 29/08* (2006.01)
*H04L 12/28* (2006.01)

(52) U.S. Cl.
CPC .......... *H04L 67/10* (2013.01); *H04L 12/2803* (2013.01)

(58) Field of Classification Search
CPC ....... H04L 67/10; H04L 63/10; H04L 67/104; H04L 67/125; H04L 67/04; H04L 67/14
See application file for complete search history.

(56) References Cited

U.S. PATENT DOCUMENTS

| | | | |
|---|---|---|---|
| 6,249,836 B1 | 6/2001 | Downs et al. | |
| 6,665,565 B1 | 12/2003 | Stomberg et al. | |
| 7,805,706 B1 | 9/2010 | Ly et al. | |
| 8,621,069 B1 | 12/2013 | Tompkins | |
| 8,788,855 B2 | 7/2014 | Cong et al. | |
| 9,256,467 B1 | 2/2016 | Singh et al. | |
| 9,449,346 B1 | 9/2016 | Hockey et al. | |
| 9,461,876 B2 * | 10/2016 | Van Dusen | ............. H04L 41/04 |
| 9,753,669 B2 * | 9/2017 | Ben-Shaul | ............ G06F 9/5061 |
| 2003/0032417 A1 | 2/2003 | Minear et al. | |
| 2004/0040025 A1 | 2/2004 | Lehtinen | |
| 2004/0054997 A1 | 3/2004 | Katragadda et al. | |
| 2006/0136928 A1 | 6/2006 | Crawford et al. | |
| 2006/0168575 A1 | 7/2006 | Bhatt et al. | |
| 2006/0168581 A1 | 7/2006 | Goger et al. | |
| 2007/0118657 A1 | 5/2007 | Kreitzer et al. | |
| 2007/0245331 A1 | 10/2007 | Daynes et al. | |
| 2010/0131792 A1 | 5/2010 | Herrod | |
| 2010/0153941 A1 | 6/2010 | Borissov et al. | |

(Continued)

FOREIGN PATENT DOCUMENTS

WO   2014047073 A1   3/2014

OTHER PUBLICATIONS

International Search Report and Written Opinion dated Feb. 16, 2016, issued in International Patent Application No. PCT/US2015/050513, filed Sep. 16, 2015, 20 pages.

(Continued)

*Primary Examiner* — Sargon N Nano
(74) *Attorney, Agent, or Firm* — Davis Wright Tremaine LLP

(57) ABSTRACT

A service provider may provide a companion computer system associated with a set of physical device of a building connected to a network in order to facilitate operation of the building. The companion computer system and the building and/or set of physical devices may be associated in a database operated by the service provider. Furthermore, the companion computer system may execute a component of an application on behalf of the set of physical devices. The physical devices may be responsible for performing various operations in connection to the building, such as climate control, security, and various other operations.

20 Claims, 11 Drawing Sheets

(56) References Cited

U.S. PATENT DOCUMENTS

| | | | |
|---|---|---|---|
| 2010/0318999 A1* | 12/2010 | Zhao | G06F 9/5044 718/104 |
| 2011/0022633 A1* | 1/2011 | Bernosky | G06F 17/3002 707/770 |
| 2012/0297311 A1 | 11/2012 | Duggal | |
| 2013/0029641 A1 | 1/2013 | Hickie | |
| 2013/0073600 A1* | 3/2013 | Jenkins | G06F 9/5027 709/201 |
| 2013/0109371 A1 | 5/2013 | Brogan et al. | |
| 2013/0191527 A1 | 7/2013 | Ashok et al. | |
| 2013/0297964 A1 | 11/2013 | Hegdal et al. | |
| 2014/0007214 A1 | 1/2014 | Qureshi et al. | |
| 2014/0149986 A1 | 5/2014 | S M et al. | |
| 2014/0153481 A1 | 6/2014 | Draznin et al. | |
| 2014/0173058 A1 | 6/2014 | Twitchell, Jr. | |
| 2014/0189388 A1 | 7/2014 | Lynar et al. | |
| 2014/0207680 A1 | 7/2014 | Rephlo | |
| 2014/0304356 A1* | 10/2014 | Allen, Sr. | H04W 8/24 709/213 |
| 2014/0344446 A1 | 11/2014 | Rjeili et al. | |
| 2015/0058473 A1* | 2/2015 | Grande | H04L 41/12 709/224 |
| 2015/0256423 A1 | 9/2015 | Stearns | |
| 2015/0331635 A1* | 11/2015 | Ben-Shaul | G06F 9/5061 711/120 |
| 2016/0034295 A1 | 2/2016 | Cochran | |
| 2016/0048399 A1 | 2/2016 | Shaw | |
| 2016/0062623 A1 | 3/2016 | Howard et al. | |
| 2016/0092248 A1 | 3/2016 | Shani et al. | |
| 2016/0216991 A1 | 7/2016 | Ansari et al. | |
| 2017/0180346 A1* | 6/2017 | Suarez | G06F 9/45558 |
| 2017/0235848 A1* | 8/2017 | Van Dusen | H04L 41/04 705/12 |
| 2017/0262697 A1* | 9/2017 | Kaps | A63F 13/812 |

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

International Search Report and Written Opinion dated Feb. 4, 2016, International Patent Application No. PCT/US2015/059983, 12 pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Soltesz et al., "Container-based operating system virtualization: a scalable, high-performance alternative to hypervisors," ACM SIGOPS Operating Systems Review 41(3):275-287, Mar. 2007.

Thiele et al., "Embedded Software in Network Processors—Models and Algorithms," Lecture Notes in Computer Science 2211:416-34, Oct. 8, 2001.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

Van et al., "SLA-aware Virtual Resource Management for Cloud Infrastructures," IEEE Ninth International Conference on Computer and Information Technology, Oct. 11, 2009, pp. 357-362.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

Xavier et al., "Performance evaluation of container-based virtualization for high performance computing environments," Parallel, Distributed and Network-Based Processing (PDP), 2013 21st Euromicro International Conference, Feb. 2013, pp. 233-240.

Zhao et al., "Experimental study of virtual machine migration in support of reservation of cluster resources," Proceedings of the 2nd international workshop on Virtualization technology in distributed computing, Nov. 2007, pp. 1-8.

U.S. Appl. No. 14/488,195, filed Sep. 16, 2014.
U.S. Appl. No. 14/834,354, filed Aug. 24, 2015.
U.S. Appl. No. 14/754,604, filed Jun. 29, 2015.
U.S. Appl. No. 14/834,364, filed Aug. 24, 2015.

* cited by examiner

INSTANCE BACKED BUILDING OR PLACE

CROSS REFERENCE TO RELATED APPLICATION

This application incorporates by reference for all purposes the full disclosure of co-pending U.S. patent application Ser. No. 14/488,195 filed Sep. 16, 2014, entitled "INSTANCE BACKED MOBILE DEVICES WITH MULTIPLE INSTANCES," and co-pending U.S. patent application Ser. No. 14/754,604, filed concurrently herewith, entitled "INSTANCE BACKED MOBILE DEVICES WITH MULTIPLE INSTANCES."

BACKGROUND

The use of network computing and storage has proliferated in recent years. The resources for network computing and storage are often provided by computing resource providers who leverage large-scale networks of computers, servers and storage drives to enable clients, including content providers, online merchants, and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed. Additionally various devices including household and other building devices are quickly outgrowing other form factors, and the development of applications for such devices is growing and becoming more ambitious.

BRIEF DESCRIPTION OF THE DRAWINGS

Various embodiments in accordance with the present disclosure will be described with reference to the drawings, in which.

DETAILED DESCRIPTION

Figure 1:
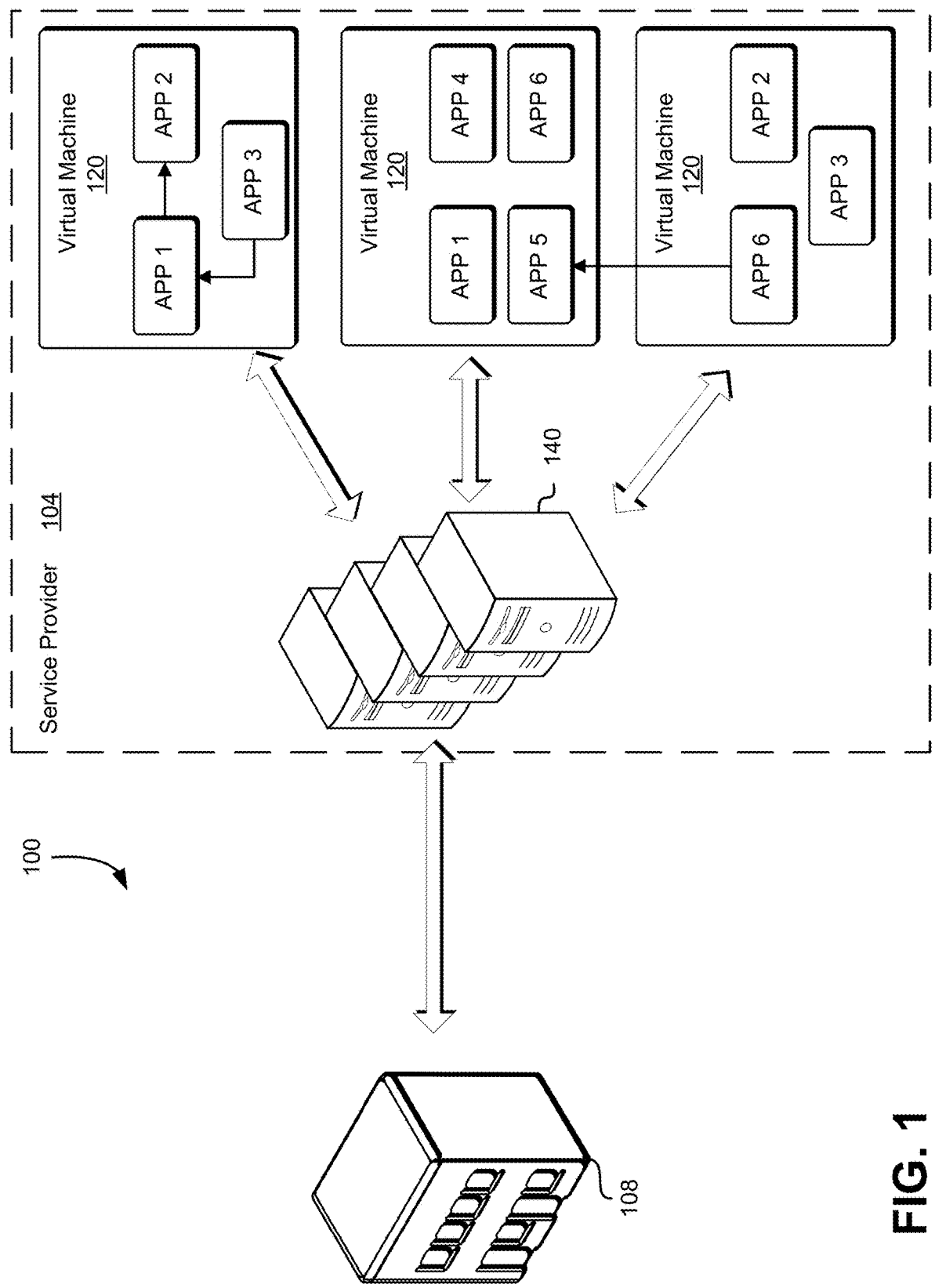
FIG. 1 illustrates an example of various physical devices interacting with a companion instance in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for various devices and applications executed by the various devices. The various devices may be from a network comprising physical objects or "things" embedded with electronics, software, sensors and connectivity to enable the various devices to achieve greater value and service by exchanging data with the manufacturer, operator and/or other connected devices. A network that includes such devices is often referred to as the Internet of Things (IOT). For example, the various devices may provide information to a companion instance hosted by a service provider to provide customers of the service provider with status information and the ability to control various attributes of the network of physical objects and each device connected to the network. Each device may be uniquely identifiable through its embedded computing system but is able to interoperate within the existing Internet infrastructure. For example, each device may be able to connect to a wireless network throughout a building, public space, or other location. In some examples, an entire building and/or the various devices is/are associated with a virtual machine instance referred to herein as a companion instance. The companion instance may be used to consolidate traffic emanating from the building and directed to the various devices associated with the building. For example, the companion instance may receive commands directed to the various devices and push the notifications to the various devices causing the various devices to execute the commands. In a specific embodiment, the companion instance may receive a command, through a management console described in greater detail below, from a customer to turn off a set of lights in the building; the companion instance may then push the command to the lights thereby causing the lights to turn off.

In some embodiments, data transmitted between the various devices and the companion instance may be compressed. For example, the companion instance may receive streaming video or images from a set of cameras, such as security cameras, connected to the network of things and may compress the image to a size optimal for the display to a customer. In another example, the companion instance may aggregate information from the various devices and determine some additional information associated with the building based at least in part on aggregated information, for example, information about individuals inside the building, a security state of the building, energy consumption, climate, status of lights and doors, and other information based at least in part on data obtained from the various devices. Additionally, the companion instance may perform various operations and/or functions on behalf of the building and/or various devices. For example, the companion instance may automatically modify the settings of the various devices based at least in part in a schedule.

The functions and/or operations performed by the companion instance on behalf of the various devices and/or building may itself minimize the amount of data processed, sent, and received from the various devices, while also conserving computing resources of the various devices by optimizing use of the radio, the processor, the memory, and other portions of the various devices. Furthermore, the companion instance may provide continuity of communication between the various devices and other devices, such as a webserver operated by a service provider. For example, the various devices may have limited connectivity or data throughput; the companion instance on the other hand may have greater data throughput and much greater availability, allowing customers a greater ability to interact with the various devices through the companion instance. Various other services and computer systems may communicate with the companion instance and the companion instance may receive communications on behalf of the various devices. The companion instance may, in some embodiments, operate a web server or management console on behalf of the various devices and/or network of various devices enabling interactions with the various devices. Packets and other information transmitted to the various devices may be routed to the companion instance and aggregated and accepted on behalf of the various devices. This may eliminate the need of the various devices to poll multiple connections in order to receive notification and other information designated for the various devices. The companion instance may establish a single connection with the various devices and transmit all of the data directly to the various devices over the established connection.

The companion instance may execute a set of applications on behalf of the various devices aggregating connections between the set of applications and other devices, including other companion instances associated with other devices, or another building or network of devices. The companion instance may be instantiated specifically to perform various operations and execute applications on behalf of the building and may be assigned only to the building. For example, a scheduling application on a companion instance associated with a building may communicate with a lighting application on the same or different companion instance associated with the building, indicating when to turn on or off a set of lights associated with the light application. Additionally, the companion instance may process data for the various devices. For example, a security device may capture an image using a camera or similar sensor of an individual; the security device may then transmit the capture image to the companion instance for processing, such as image facial recognitions or storage in database of photos of permitted or authorized individuals. In some embodiments, a software development kit (SDK) may be exposed to developers in order to enable developers to utilize the companion instance and various devices as a single entity (i.e., a single logical unit). For example, a developer may develop a monitoring application using the SDK, and the SDK may be configured to determine which portion of the application is executed by the various devices in a building and which portion is executed by the companion instance based on the capabilities or operation performed by the particular portion of the application. In various embodiments, the developer may indicate which portion of the application is to be executed by a particular device or companion instance. For example, the developer may tag an application programming interface (API) call or portion of the application as executed by key card scanner.

FIG. 1 illustrates an example environment 100 where one or more physical devices 108 included in a building or other location, as well as the associated code running thereon, may be associated with a companion instance 120. The companion instance may execute applications and perform various operations on behalf of the physical devices 108. The companion instance may be any computer system or virtual computer system configured to execute at least a portion of an application corresponding to an application executed by the physical device 108. In various embodiments, the physical devices 108 may include a set of sensors configured to obtain data and transmit data to the companion instance 120. The physical devices 108 may be any suitable computer system, sensor device, thermostat, lighting device, security device, camera, key card reader or other entry device, environmental monitor or device, home automation device, transportation device, infrastructure component or combination thereof capable of communicating with a companion instance 120 through a service provider 104.

The physical device 108 may contain multiple applications in memory. In some embodiments, a single companion instance 120 may be instantiated per physical device 108. Alternatively, the service provider 104 may provide a fleet of companion instances 120 including multiple Internet Protocol (IP) addresses and a Network address translation (NAT) gateway configured to route traffic to the IP addresses. In this scenario, each physical device 108 may be assigned a particular IP address, and traffic for the particular physical device 108 may be directed to the corresponding companion instance 120 based at least in part on information provided by the NAT gateway. In this way a single companion instance 120 or fleet of virtual machines may be associated with a single building or location while allowing communication to be routed directly to each physical device within the building.

The service provider 104 may operate system hardware 140, described in greater detail below, used to execute the companion instances 120 and enable communication between the physical device 108 and the companion instance 120. The companion instance may execute one or more applications on behalf of the physical device 108. Furthermore, the companion instance 120 may have a present power supply due to the system hardware that is executing the companion instance 120 being connected to the power grid. In some embodiments, the physical device 108 and the companion instance 120 may each execute a copy of the applications, and the applications may transmit data used during execution of the application between the physical device 108 and the companion instance 120. Additionally, separate applications may communicate between each other while being executed by the companion instance. For example, a messaging application executed by the companion instance 120 may communicate with a photo gallery application executed by the companion instance 120.

Application executed by the companion instance 120 may also transmit data to one or more other companion instances 120. The companion instance 120 may enable the recipient physical device 108 to receive data without requiring the recipient physical device 108 to be connected to a network. In some embodiments, an agent application, described in greater detail below, may be used to facilitate the transmission and reception of notifications between the physical device 108 and the companion instance 120. For example, the companion instance 120 may receive data on behalf of the physical device 108 and transmit a notification of the received data to the physical device 108. At some point in time later, the physical device 108 may obtain the data from the companion instance 120. In some embodiments, the agent application may provide data corresponding to the state of the physical device 108 and/or information collected by one or more sensors of the physical device 108. The companion instance 120 may perform a variety of operations based at least in part on the received information. For example, the companion instance 120 may notify another companion instance or other service provider that the physical device is in a particular location.

As illustrated by FIG. 1, data may be transmitted between applications of a single companion instance 120 or between applications of multiple virtual machines 120. For example, a key card reader of the building may transmit information to a particular computer system that the user of the computer system has entered the building and to start the user's desktop computer system using Wake-on-LAN (WoL) or other Ethernet computer networking standard that allows a computer to be turned on or awakened by a network message. Furthermore, the information may be transmitted to a companion instance 120 associated with another building, for example a user's leaving work information may be transmitted from the user's office building to the user's home, causing the light in the user's home to be illuminated. In various embodiments, the companion instance 120 may aggregate information from the one or more physical devices 108 included in the building and determine additional information. For example, the companion instance may aggregate an individual's movement within the building obtained from a key card reader, the user's mobile phone, and camera. This aggregated information may be used by the companion instance 120 to determine information such as elevator schedules, lighting parameters, and climate control settings.

Figure 2:
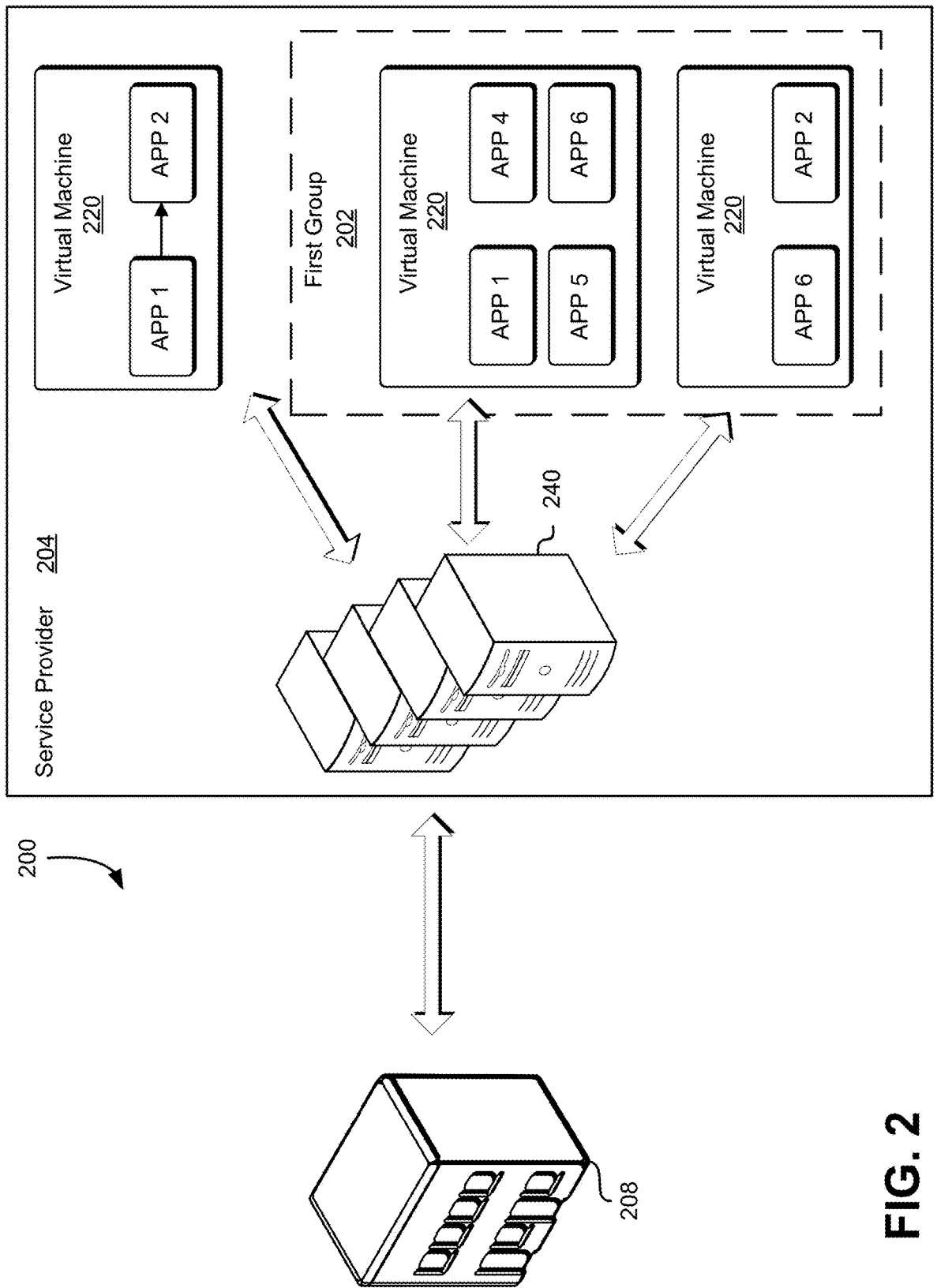
FIG. 2 illustrates an example of a grouping of physical devices interacting with a companion instance in accordance with an embodiment.

FIG. 2 illustrates an example environment 200 where one or more physical devices 108 owned and/or associated with a single building, as well as the associated code running thereon, may be associated with a set of companion instances 120 organized into one or more groups. A service provider 204 may provide a variety of services to the customer, and the customer may communicate with the service provider 204 via an interface executed by the system hardware 240, which may be a web services interface or any other type of customer interface. The customer may be an organization that may utilize one or more of the services provided by the service provider 204 to maintain and deliver information to its employees, who may be located in various geographical locations. Additionally, the customer may be an individual that utilizes the services of the computing resource service provider. The customer may operate a building, including one or more physical devices configured to communicate with the service provider 204 through a network, whereby the network may be a communication network, such as the Internet, an intranet or an Internet service provider (ISP) network. Some communications from the customer to the service provider 204 may cause the service provider 204 to operate in accordance with one or more embodiments described herein or a variation thereof.

As illustrated in FIG. 2, the building may be associated with a set of companion instances communicating with one or more physical devices 208 included in the building. For example, the one or more physical devices 208 may be registered with the service provider 204, and the registration process may associate a particular companion instance of the set of companion instances 120 with the registered one or more physical devices 108. The companion instance 120 may provide synchronization between the one or more physical devices 208 included in the building. For example, the customer may modify the climate control settings for a particular set of physical devices 208 through the companion instance 120 associated with the set of physical devices 208. For example, the set of physical devices 208 responsible for climate control of the building may be organized into a first group 202. The first group 202 may include a set of companion instance associated with the climate control system. Additionally a group may be divided in to sub-groups or regions or other organizations to enable the customer to interact with and control the physical devices. For example, the set of doors for a building or climate control system for a building may be divided into sub-groups for each floor of the building.

Additionally, the customer may access one or more of the building's physical devices 208 from another device. For example, the customer may access various physical devices 108 of the building using another computer system connected to the companion instance 120. The customer may have the ability to connect directly to the physical device 208, for example when the customer is in the building, or the customer may be able to access the physical devices from a remote location by communicating directly to the companion instance associated with the building or physical device.

In some embodiments, the companion instance 220 may execute software and other applications on behalf of the physical device 208 and the physical device 208 may execute a receiver application configured to connect to the companion instance 220 and exchange data with the companion instance 120. The companion instance 220 may enable communication between one or more applications executed by the companion instance 220 or one or more other companion instances as described above in connection with FIG. 1. In some embodiments, the companion instance 220 may be configured to alert a customer of an activity captured or detected by a physical device 208. For example, the customer may receive a notification on a device from the companion instance 220 that a particular set of credentials has been used to physically access the building.

Figure 3:
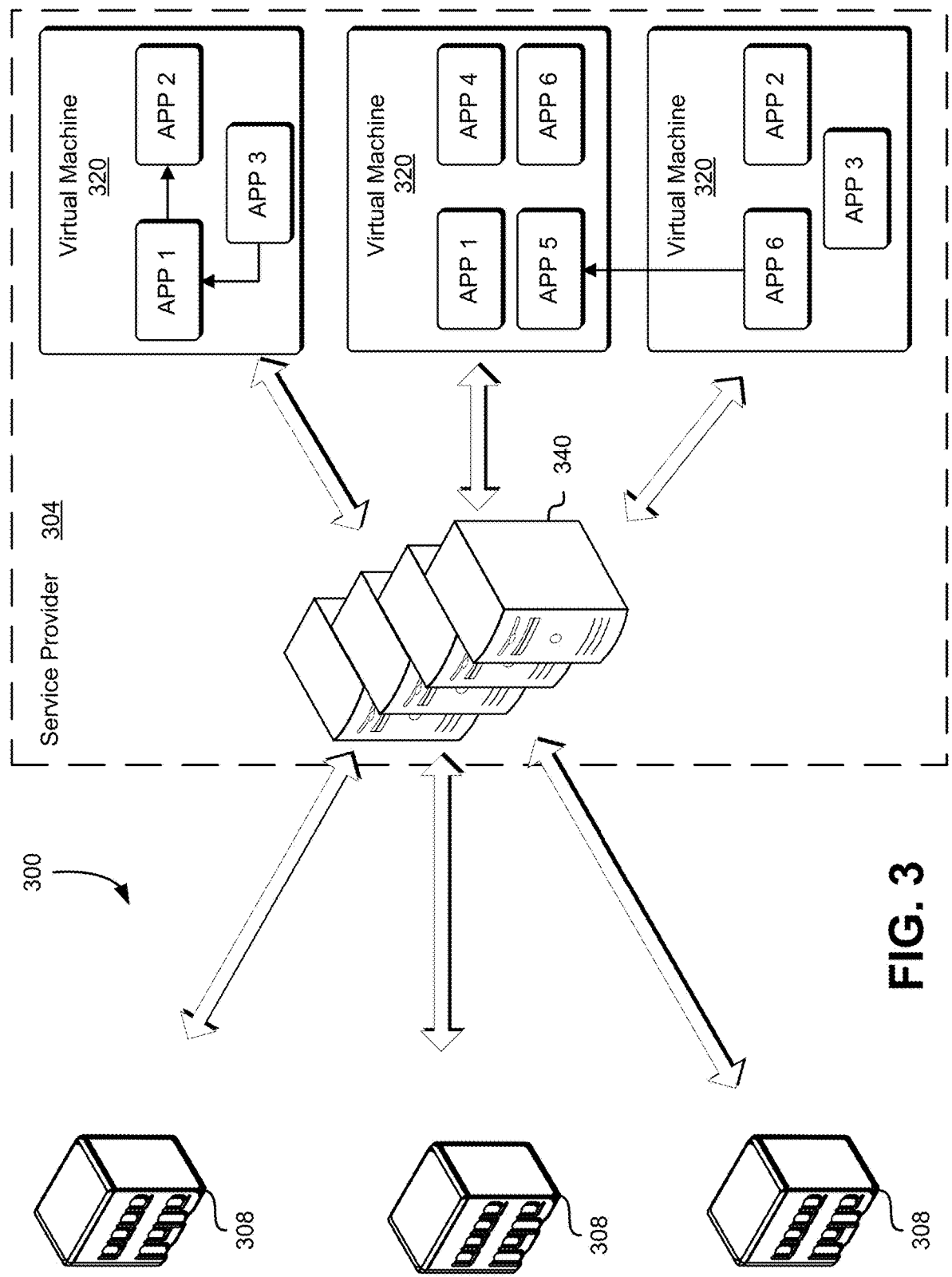
FIG. 3 is an illustrative example of a set of physical devices interacting with a set of companion instances in accordance with at least one embodiment.

FIG. 3 illustrates an example environment 300 where one or more physical devices 308 included in a set of buildings or other locations (e.g., a campus or other set of buildings associated with each other), as well as the associated code running thereon, may be associated with a companion instance 320. The companion instance may execute applications and perform various operations on behalf of the physical devices 308 and/or a set of buildings. The companion instance may be any computer system or virtual computer system configured to execute at least a portion of an application corresponding to an application executed by the physical device 308. In various embodiments, the physical devices 308 may include a set of sensors configured to obtain data and transmit data to the companion instance 320. The physical devices 308 may be any suitable computer system, sensor device, thermostat, lighting device, security device, camera, key card reader or other entry device, environmental monitor or device, home automation device, transportation device, infrastructure component or combination thereof capable of communicating with a companion instance 320 through a service provider 304.

As illustrated by FIG. 3, a plurality of buildings, including a plurality of physical devices 308 distributed among the plurality of buildings, may be associated with a companion instance 320 or fleet of companion instances. For example, a set of buildings may be organized into a campus or other logical unit; the set of buildings may be treated by the service provider 304 and companion instances as a single building. As described above, the physical devices 308 of the building may be organized into a variety of groups or otherwise organized such that the customer may have finer control of the physical devices 308.

Figure 4:
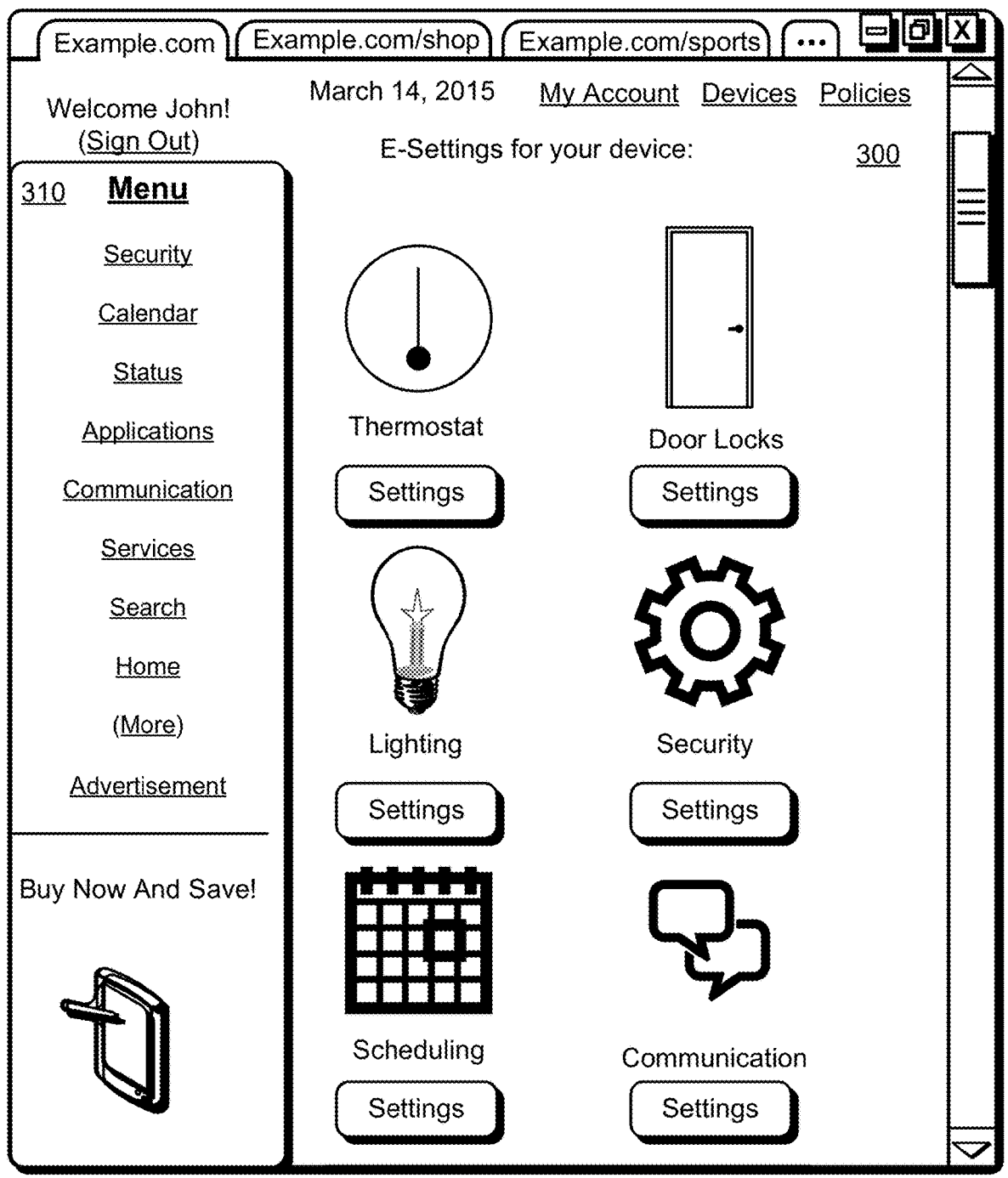
FIG. 4 illustrates an example of a webpage of managing physical devices associated with a companion instance in accordance with an embodiment.

FIG. 4 shows a webpage 400 which may be displayed by a management console configured to enable a customer to interact with one or more physical devices connected to a companion instance. As illustrated in FIG. 4, the webpage 400 includes various graphical user interface elements that enable navigation throughout the management console of which the webpage 400 is a part. In various embodiments, the webpage 400 is implemented by a service provider, and the service provider is responsible for receiving customer input into the webpage 400 and transmitting the received input to various other services of the service provider configured to instantiate a companion instance associated with the physical device or otherwise possess the customer's input. For example, as described in greater detail below, the customer's input may cause the service provider to enable the customer's physical device and an associated companion instance to access an application in order to install the application on the physical device and the companion instance. In another example, customer input may cause the companion instance to transmit a request to a particular physical device, the request causing the physical device to modify one or more attributes of the physical device or something connected to the physical device, such as a door or a window. The webpage 400 may be displayed by various applications, such as a mobile application or web browser. In this example, the webpage 400 includes various navigational features. For instance, on the left-hand side of the webpage 400, various links 410 may link to one or more other webpages that contain additional content corresponding to the management console. In this example, the links appear as textual words which enable the links to be selected using an appropriate input device such as a keyboard, mouse, touchscreen or other input device. Selection of one of the links 410 may cause an application displaying the webpage 400 to submit, pursuant to a uniform resource locator (URL) associated with the selected link by the programming of the webpage 400, an HTTP request for the content associated with the link to a server that provided the webpage 400 or another server. In this example, the webpage 400 also includes a graphical user element configured as a "settings" button. The settings button may be a graphical user interface element of the webpage 400 where the underlying code of the webpage 400 is configured such that selection by an input device of the setting button causes information corresponding to the selection to be transmitted to one or more servers of the service provider.

The webpage 400 may also include a description of the physical devices and/or other information associated with the physical devices displayed in webpage 400. The description may provide information to the customer, including whether the physical devices are associated with a companion instance. In some embodiments, the physical device may be provided with a companion instance when a customer requests a companion instance through the management console. For example, a companion instance may be instantiated and associated with the customer's physical device once the customer has downloaded and/or installed an application configured to interact with physical device that is supported by a companion instance. In this example, the webpage 400 contains six groupings of physical devices the customer may interact with. The grouping may contain one or more physical devices distributed over one or more geographic locations. The grouping may also contain different types of physical devices. For example, the security grouping may include cameras and door locks which may also be found in the door locks setting as well.

Furthermore, the physical devices displayed in the webpage 400 may correspond to services offered by the service provider or one or more other organizations. For example, the services may include a security service, delivery service, or other service. The physical devices displayed on the webpage 400 may contain a presentation of the application such as a graphical representation of the service or operation associated with the physical devices, which could be text and/or a drawing, photograph, description, identification number, trademark, video clip, audio clip or any other representation capable of representing the items. Other variations of the user interface displayed in FIG. 4 may be used in accordance with the present disclosure. For example, drop-down menus may be included in the user interface to enable the user to select a particular user account or information associated with a customer account to include when provisioning new physical devices.

Figure 5:
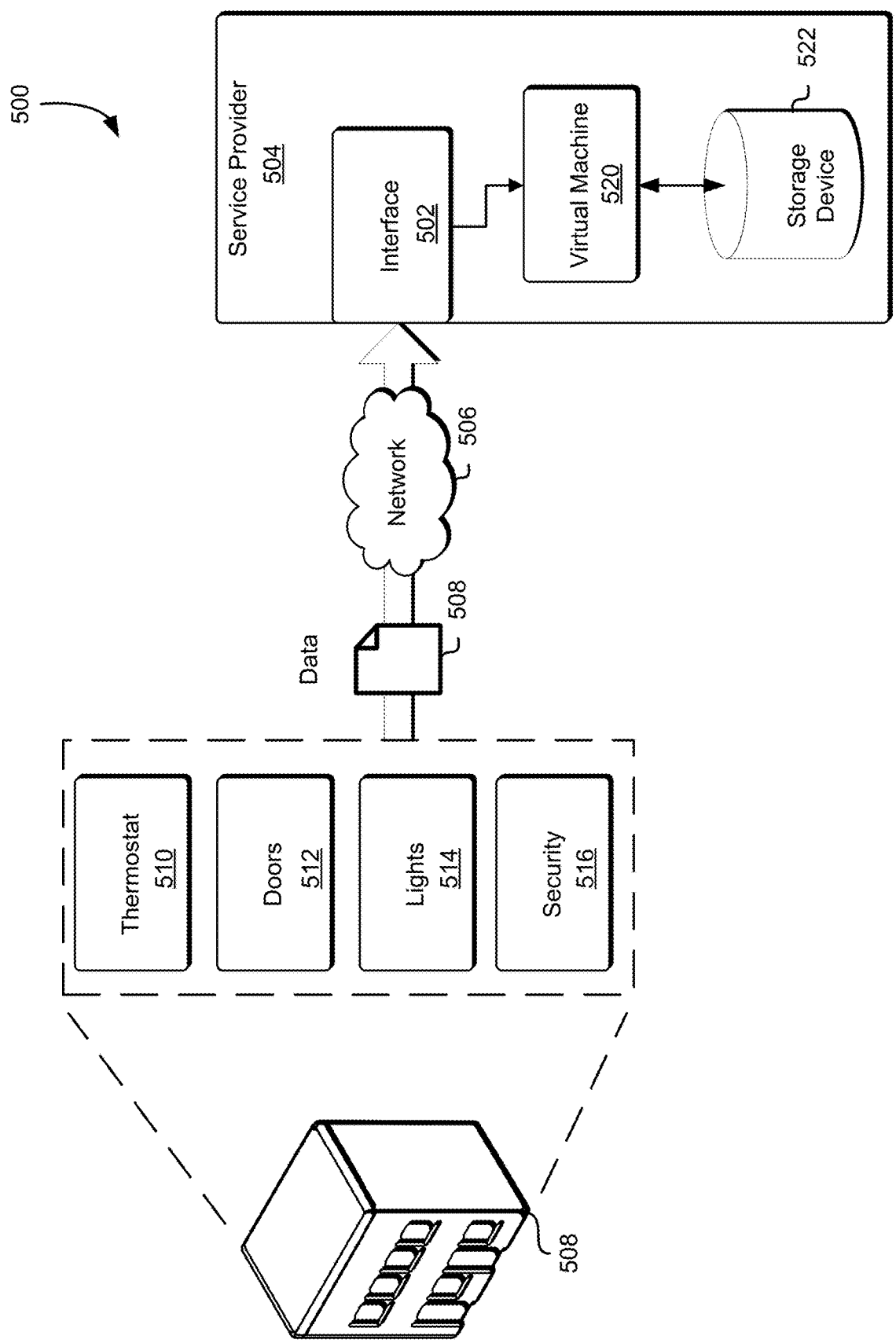
FIG. 5 illustrates an example of a various physical devices providing data to a companion instance in accordance with an embodiment.

FIG. 5 shows an example 500 of a set of physical devices 508 included in a building, which sends data 508 to a service provider 504 to interact with a companion instance 520. The computing resource service provider 504 may provide a companion instance 520 in order to support the operation of the physical devices 508 and customer interaction with the physical devices 508. The physical devices 508 may send data 508 to the service provider 504 over a network 506, such as the Internet; the data 508 may be generated or obtained by the physical devices 508. In various embodiments, the data includes appropriately configured API calls generated by the physical devices 508 or application thereof such as an agent application described in greater detail below. The data 508 may be received by an interface 502 or front end of the computing resource service provider or a particular service of the computing resource service provider. As illustrated by FIG. 5, the one or more physical devices 508 may include a thermostat 510, doors 512, lights 514, or a security device 516. Although only these physical devices are illustrated in FIG. 5, the techniques described in the present disclosure may be used in connection with any device capable of connection to a network as described above.

The data 508 may directed to the appropriate system, such as the virtual machine management service 502 shown in FIG. 5. As data 508 is received by the interface 502, information corresponding to the data 508 may be used to route the data 508 to the appropriate service and/or system. For example, the data may include building identification information, companion instance identification information, or information to identify the physical device 508 associated with the data 508. In some embodiments, the interface 502 may query the virtual machine management service to determine a location of the companion instance 520 associated with the data 508 and transmit the data 508 directly to the associated companion instance 520. In various embodiments the virtual machine management service may manage the operation of one or more companion instances 520. While FIG. 5 shows one interface 502 for the service provider 504, each service of the service provider 504 may operate an interface and, generally, subsets of the services may have corresponding interfaces in addition to or as an alternative to the interface 502.

In various embodiments, the companion instance is executed in a container or may otherwise be segregated such that communication between the companion instance 520 and other systems of the service provider is limited, as described in greater detail below. Additionally, the companion instance 520 may include a storage device 510; the storage device may be on-demand data storage, block-level storage, or any other suitable data store or virtualization thereof. The storage device 510 may be utilized to store information on behalf of the physical devices 508 including the data 508 transmitted to the companion instance 520. For example, the companion instance 520 may be configured to back up data generated by the physical devices 508 or data generated by the companion instance 520 on behalf of the physical devices 508.

Figure 6:
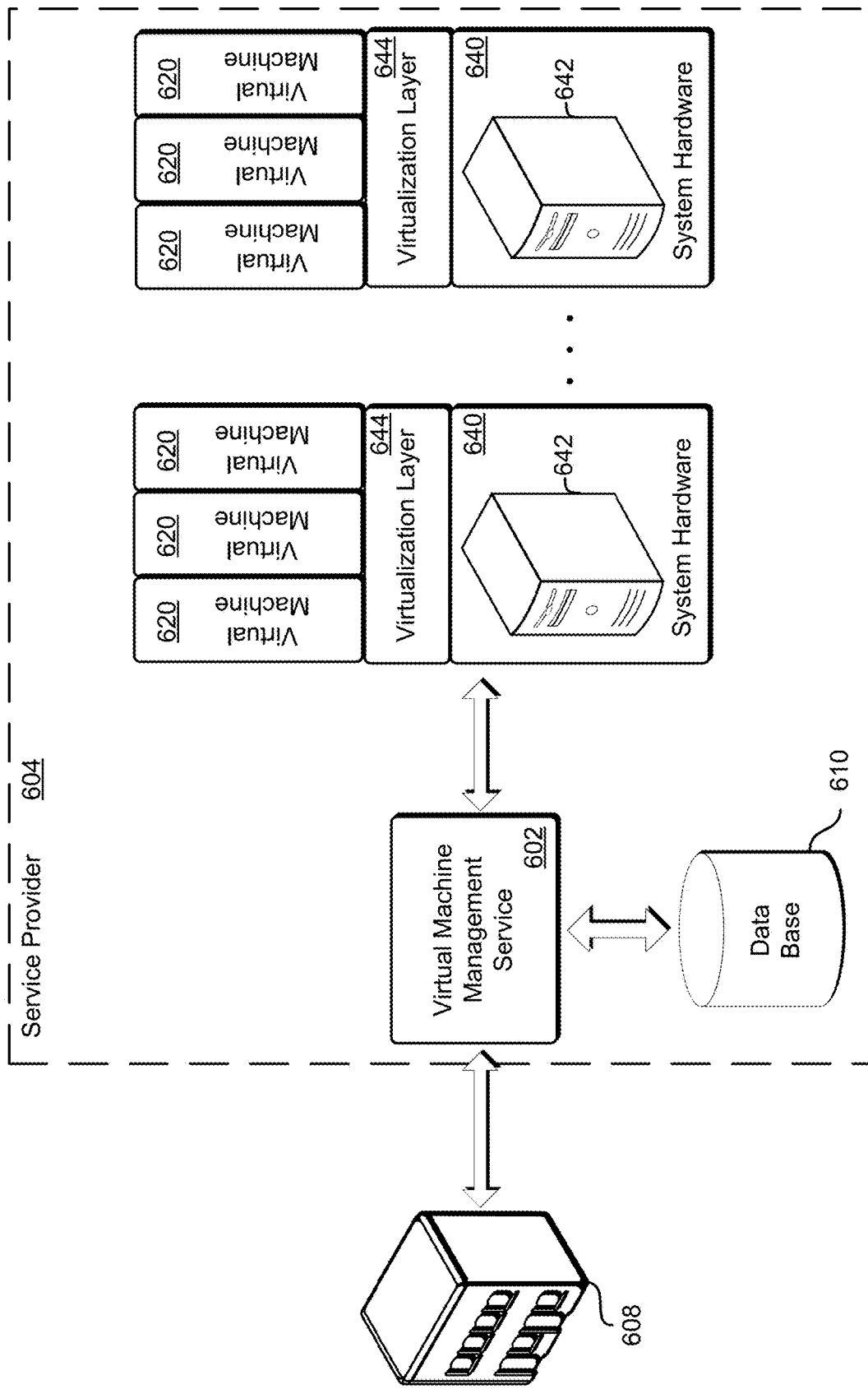
FIG. 6 illustrates an environment for providing a container instance to a building in accordance with at least one embodiment.

FIG. 6 illustrates an environment 600 in which a virtual computer system service provides companion instances for physical devices 608 in accordance with at least one embodiment. The virtual computer system service, which may be system hardware 640, is used by a service provider 604 to provide computational and other resources for physical devices. The system hardware 640 may include physical hosts 642. The physical hosts 642 may be any devices or equipment configured to execute instructions for performing data computation, manipulation or storage tasks, such as a computer or a server. A physical host 642 may be equipped with any needed processing capability, including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The system hardware 240 may also include storage devices, such as storage disks and tapes, networking equipment and the like.

A virtualization layer 644 executing on the physical host 642 enables the system hardware 640 to be used to provide computational resources upon which one or more companion instances 620 may operate. For example, the virtualization layer 644 may enable a companion instance 620 to access system hardware 640 on the physical host 642 through virtual device drivers on the virtual machine 620. Furthermore, a physical host 642 may host multiple companion instances 620 of the same or different types on the same system hardware 640. The companion instances 620 may be any devices, software or firmware used for providing a computing platform for the physical device 608. For example, the companion instance may, in some embodiments, be implemented as a physical computer system configured to perform operations on behalf of the physical device 608. Furthermore, the companion instance 620 may be generated and/or instantiated as a result of the physical device 608 completing boot operations.

The virtual computing platform may include various virtual computer components, such as one or more virtual CPUs, virtual memory and the like. The companion instances 620 may be provided to the customers of the service provider 604 and the customers may run an operating system or an application on the virtual machines 620 in support of the physical device 608. Further, the service provider 604 may use one or more of its own virtual machines 620 for executing its applications, such as the application management service described above.

In some embodiments, the physical device 608 may communicate with the corresponding companion instance through the virtual machine management service 602. For example, the physical device may transmit commands and other information to the virtual machine management service, and the commands may indicate operations to be performed by the companion instance. The commands and other information may be included in an API call from the virtual machine management service 602 to the companion instance 620. The virtual machine management service 602 may enable the physical device 608 to manage and operate the companion instances 620.

For example, the physical device 608 may transmit a request to the virtual machine management service 602 to have the companion instance 620 process an image. The request may be an API call including information corresponding to the image and the companion instances 620. The virtual machine management service 602 may determine the corresponding physical host 642 for the companion instances 620 included in the request and transmit the image and/or request to the companion instance. The virtual machine management service 602 may maintain a database 610 with one or more records containing information corresponding to the companion instances 620. For example, the database 610 may contain a Domain Name System (DNS) entry indicating an IP address useable for communicating with a particular companion instance. Returning to the example above, the virtual machine management service 602 may receive a request from the physical device to interact with the corresponding companion instance 620. The virtual machine management service 602 may locate the companion instance 620 in the database 610 and transmit the request to the companion instance 620.

In another example, the request from the physical device may include a request to instantiate a companion instance 620. The virtual machine management service 602 may then determine a physical host 642 capable of executing the companion instance 620 on system hardware 640. The virtual machine management service 602 may then send the command to instantiate the companion instance 620 to the virtualization layer 644 on the determined physical host 642. The virtualization layer 644 may then instantiate the companion instance 620. The virtualization layer 644 may then return information corresponding to the companion instance 620 to the virtual machine management service 602, and the virtual machine management service 602 may record at least a portion of the information in the database 610. For example, the virtualization layer 644 may return location information corresponding to the companion instance 620 which may then be stored in a record in the database associated with the physical device 608.

Figure 7:
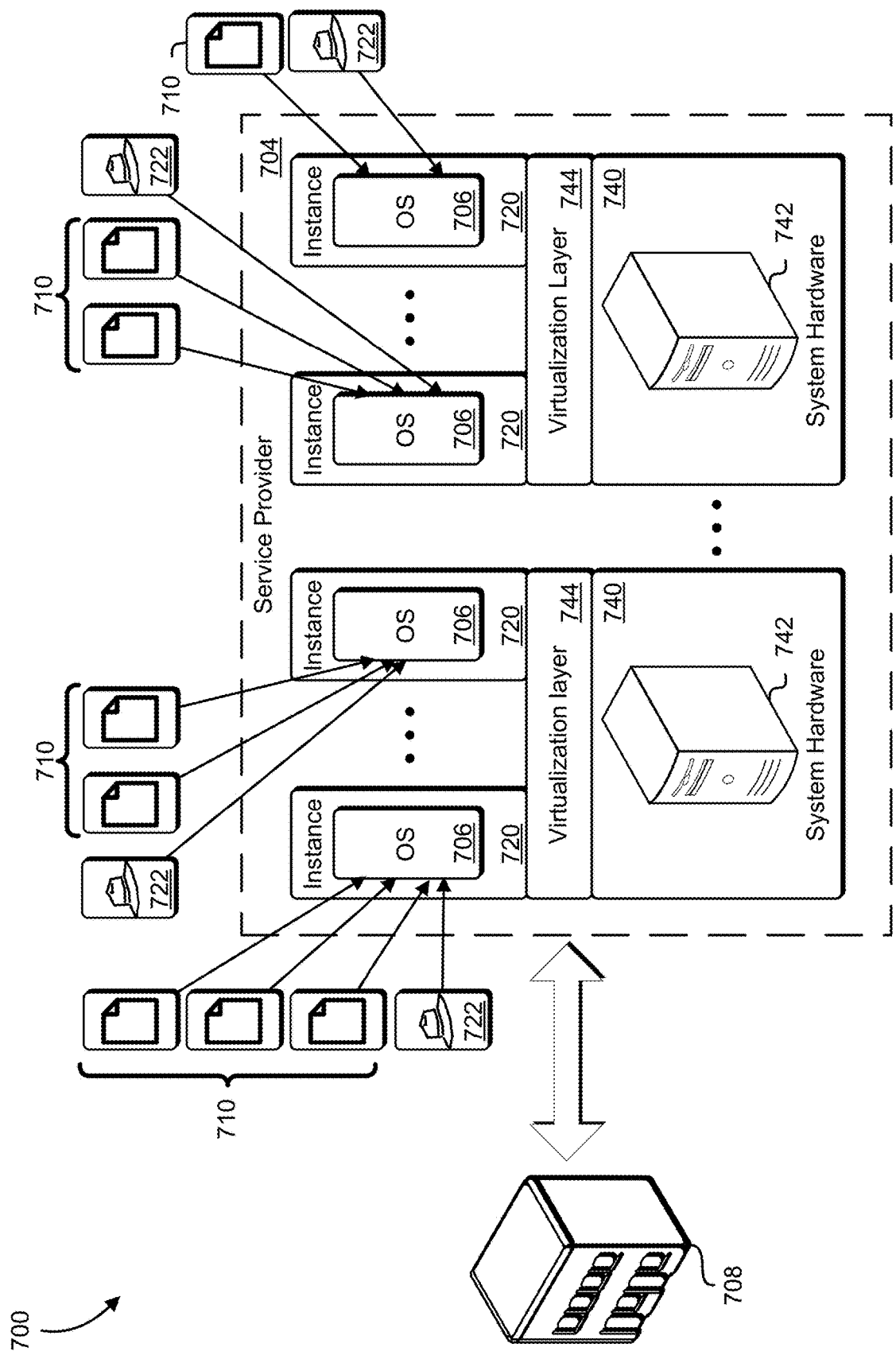
FIG. 7 illustrates an environment for providing an instance to a set of physical device included in a building in accordance with at least one embodiment.

FIG. 7 illustrates an aspect of an environment 700 in which an embodiment may be practiced. Specifically, FIG. 7 depicts a container service, executing a plurality of virtual machines configured as container instances 720 in accordance with at least one embodiment. The container service may provide system hardware 740 to physical devices 708 of a computing resource service provider 704 providing the container service to perform computation services within containers 710. The system hardware 740 may include one or more hosts 742, also referred to as host computer systems. Each of the hosts 742 may be any device or equipment configured to execute instructions for performing data computation, manipulation, or storage tasks, such as a computer or a server. The hosts 742 may be equipped with any needed processing capability including one or more processors, such as a central processing unit, a graphics processing unit, or a digital signal processor. The hosts 742 may also be equipped with memory (e.g., static and dynamic memory), buses, and input and output ports that are compliant with any handshaking, communications or data transfer protocol. The system hardware 740 may also include storage devices, such as storage disks and tapes, and networking equipment. The storage devices may be network storage devices managed by a data storage service, such as a block-level data storage service.

Virtualization layers 744 in the system hardware 740 enable the system hardware 740 to be used to provide computational resources upon which one or more container instances 720 may operate and be used to execute software containers and other tasks. The virtualization layer 744 may be any device, software, or firmware used for providing a virtual computing platform for the container instances 720. The virtualization layers 744 executing on the hosts 742 enable the set of system hardware 740 to be used to provide computational resources necessary to support the container instances 720. Furthermore, the physical host 742 may host multiple virtualization layers of the same or different types on the same system hardware 740. Each container instance 720 may include various virtual computer components, such as one or more virtual processors, virtual memory, and virtual storage. The container instances 720 may be provided to the mobile device 708 operated by customers of the computing resource service provider 704, and the container instances 720 may run an operating system 706 and applications (e.g., software containers 710) on each of the container instances 720. An example of a virtualization layer 744 includes a hypervisor.

Requests may be received by a request interface, such as the front end or interface operated by the computing resource service provider 704. The request interface may direct the request to the appropriate container instance 720. Each container instance 720 may include one or more software agents 722. The software agents 722 may be configured to allow the physical device 708 to manage and interact with their respective software containers 710 and container instances 720. The software agents 722 may be further configured to perform logging of events and gather telemetry data related to the software containers 710 and container instances 720.

The operating systems 706 may be any operating systems suitable for running within the container instances 720 and that provide isolation technology that enable containerization schemes to isolate virtualization instances, such as the software containers 710, from other processes running under the operating system 706. Examples of such operating systems include various implementations of Linux operating systems that support resource isolation features in the Linux kernel. As noted, the software containers 710 may be virtualized instances within the operating systems 706 launched from application images in accordance with one or more task definitions, and may be allocated resources from their respective container instances 720.

Figure 8:
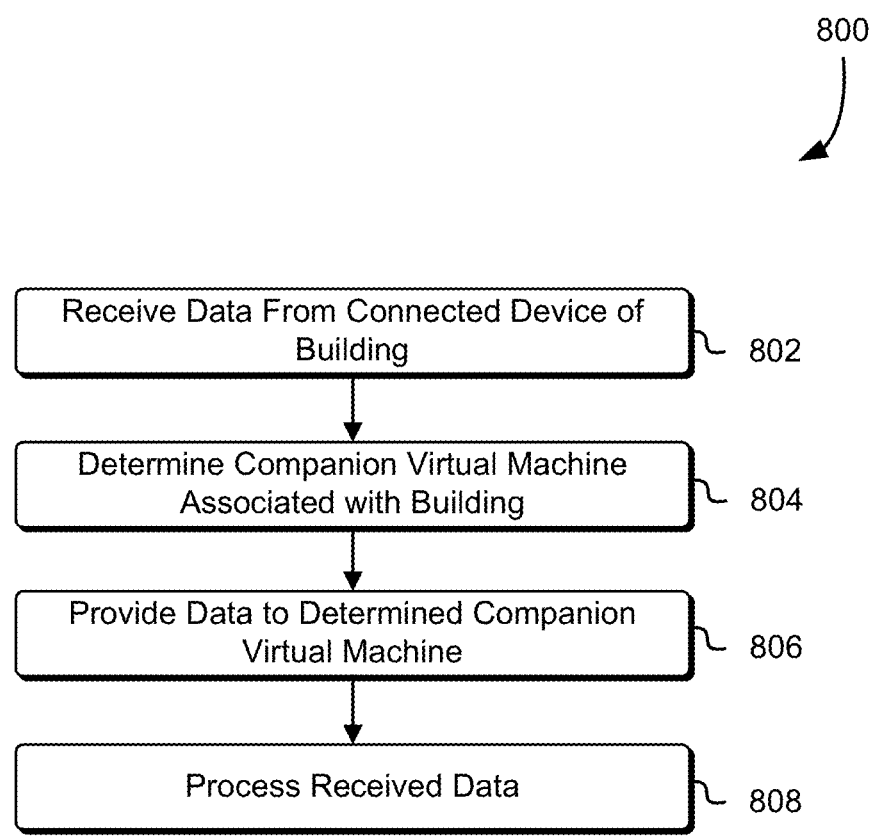
FIG. 8 is an illustrative example of a process for processing data received from a building device in accordance with at least one embodiment.

FIG. 8 shows an illustrative example of the process 800 which may be used to process data received from one or more physical devices of a building on behalf of a customer by a companion instance. The process 800 may be performed by any suitable system such as the companion instance described above in connection with FIGS. 1-3 or the container service described above in connection with FIG. 7. Returning to FIG. 8, in an embodiment, the process 800 includes receiving data from a physical device of a building connected to a network 802. The physical device may be one of any number of various devices described above and may be integrated with some function or operation of the building such as lights, doors, environment control, or another aspect of the building. The data may be received over a network as described above and may include information obtained or generated by the physical device or set of physical devices. For example, the physical device may include a set of temperature sensors distributed throughout a building or a set of weather sensors distributed throughout a geographic location.

Returning to FIG. 8, an interface of the provider may receive the data and determine a companion instance associated with the building 804. For example, the service provider may maintain a database which includes information associating one or more physical devices with a particular building and/or companion instance. The interface may then provide the data to the determined companion instance 806. For example, the interface may transmit the data over a network to the particular physical host implementing the companion instance based at least in part on a DNS entry or other name server. Once the companion instance has received the data, the companion instance may process the data 808. For example, the companion instance may encrypt the data, compress the data, store the data, determine additional information based at least in part on the data, or process that data in some other manner as indicated by the customer.

Figure 9:
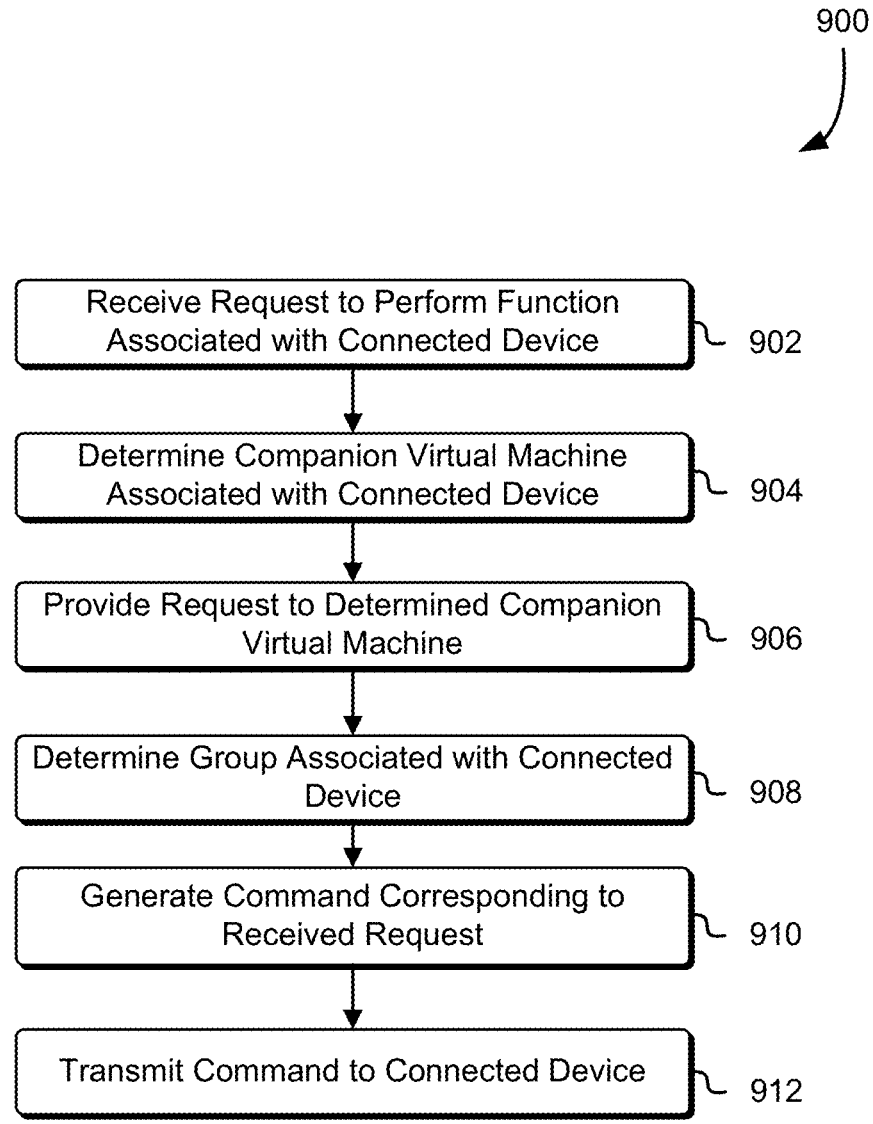
FIG. 9 is an illustrative example of a process for transmitting a command to a building device in accordance with at least one embodiment.

FIG. 9 shows an illustrative example of the process 900 which may be used to transmit a command to one or more physical devices of a building on behalf of a customer by a companion instance. The process 900 may be performed by any suitable system such as the companion instance described above in connection with FIGS. 1-3 or the container service described above in connection with FIG. 7. Returning to FIG. 9, in an embodiment, the process 900 includes receiving a request to perform a function associated with a physical device connected to a network and included in a building or other geographic location. For example, the request may include a command to open a door or turn on lights in a particular building. The request may be transmitted by a management console exposed to the customer and configured to receive input from a customer and perform one or more operations in response to the received customer input.

In response to receiving the request, the computing resource service provider or component thereof executing the process 900 may determine a companion instance associated with the physical device 904. As described above the request may include information identifying the appropriate companion instance or fleet of companion instances. The request may then be provided to the determine companion instance 906. In numerous variations to the process 900, the request may be provided to a scheduler or other entity responsible for distributing tasks to the companion instances. Furthermore, the request may be provided to a particular companion instance or a fleet of companion instances.

Returning to FIG. 9, the companion instance may then determine a group associated with the connected device 908. For example, the group may include the group of devices for a particular floor or a particular building or a set of buildings or a campus. The companion instance may then generate a command corresponding to the received request 910. For example, the companion instance may generate an API call associated with the request, where the API call is configured to cause the physical device to perform an operation indicated in the request. The generated command may then be transmitted to the physical device over a network 912. In numerous variations to the process 900, the request may be in a format accepted by the physical device, and the companion instance may simply transmit the command to the physical device. Additionally, the request may be received from a computer system without direct interaction with the customer. For example, a building scheduler may transmit a request to the companion instance to turn off lights after hours for a particular building.

Figure 10:
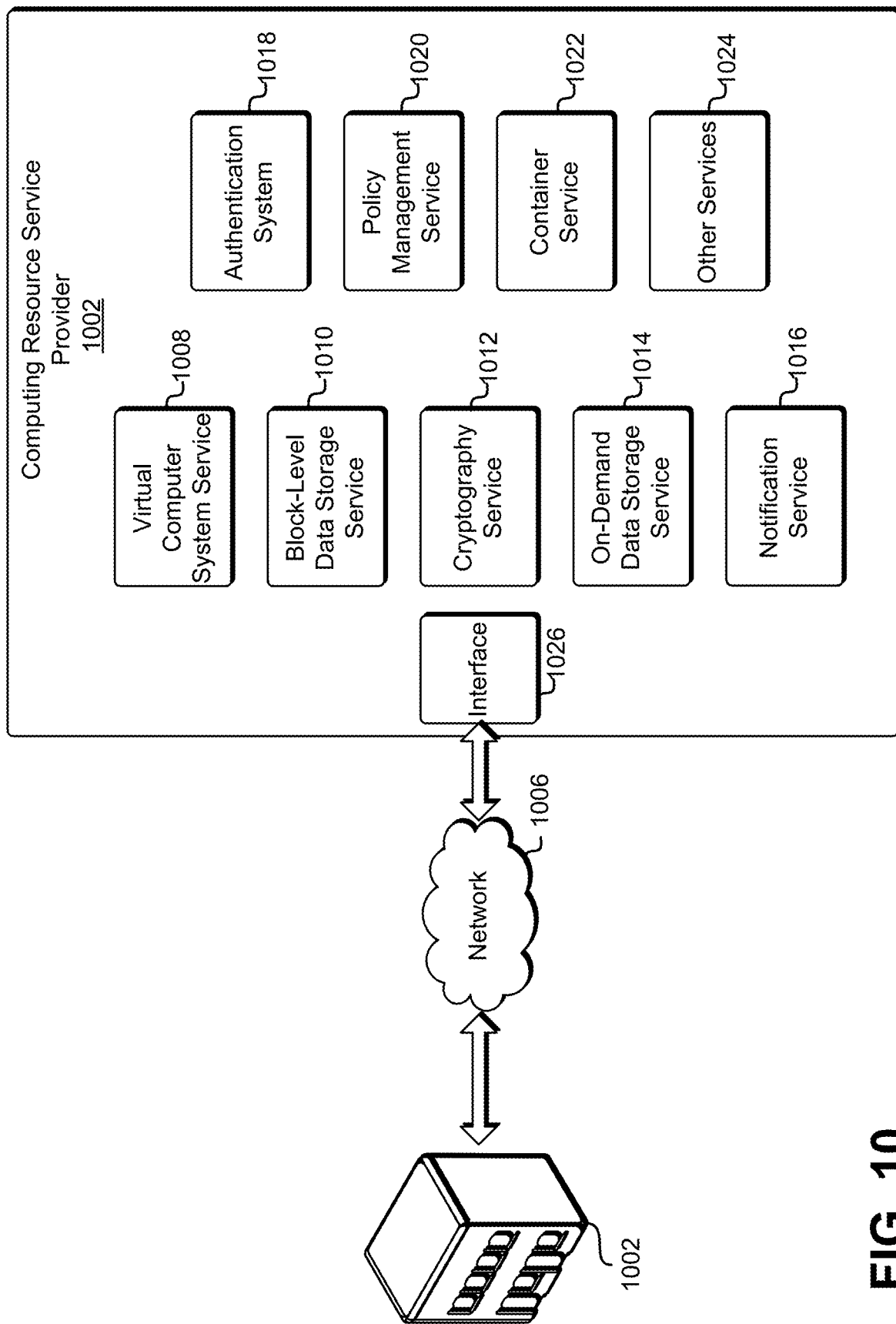
FIG. 10 illustrates an example service design of a system for managing building devices associated with a companion instance in accordance with an embodiment.

FIG. 10 shows an example of a customer and/or physical devices of the customer connected to a computing resource service provider in accordance with at least one embodiment. The computing resource service provider 1002 may provide a variety of services to the customer 1004 and the customer 1004 may communicate with the computing resource service provider 1002 via an interface 1026, which may be a web services interface or any other type of customer interface. While FIG. 10 shows one interface 1026 for the services of the computing resource service provider 1002, each service may have its own interface and, generally, subsets of the services may have corresponding interfaces in addition to or as an alternative to the interface 1026. The customer 1004 may be an organization that may utilize one or more of the services provided by the computing resource service provider 1002 to maintain and deliver information to its employees, which may be located in various geographical locations. Additionally, the customer 1004 may be an individual that utilizes the services of the computing resource service provider 1002 to deliver content to a working group located remotely. As shown in FIG. 10, the customer 1004 may communicate with the computing resource service provider 1002 through a network 1006, whereby the network 1006 may be a communication network, such as the Internet, an intranet or an Internet service provider (ISP) network. Some communications from the customer 1004 to the computing resource service provider 1002 may cause the computing resource service provider 1002 to operate in accordance with one or more embodiments described, or a variation thereof.

The computing resource service provider 1002 may provide various computing resource services to its customers. The services provided by the computing resource service provider 1002, in this example, include a virtual computer system service 1008, a block-level data storage service 1010, a cryptography service 1012, an on-demand data storage service 1014, a notification service 1016, an authentication system 1018, a policy management service 1020, a container service 1022 and one or more other services 1024. It is noted that not all embodiments described include the services 1008-24 described with reference to FIG. 10 and additional services may be provided in addition to or as an alternative to services explicitly described. As described, each of the services 1008-24 may include one or more web service interfaces that enable the customer 1004 to submit appropriately configured API calls to the various services through web service requests. In addition, each of the services may include one or more service interfaces that enable the services to access each other (e.g., to enable a virtual computer system of the virtual computer system service 1008 to store data in or retrieve data from the on-demand data storage service 1014 and/or to access one or more block-level data storage devices provided by the block-level data storage service 1010).

The virtual computer system service 1008 may be a collection of computing resources configured to instantiate virtual machine instances on behalf of the customer 1004. The customer 1004 may interact with the virtual computer system service 1008 (via appropriately configured and authenticated API calls) to provision and operate virtual computer systems that are instantiated on physical computing devices hosted and operated by the computing resource service provider 1002. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 1008 is shown in FIG. 10, any other computer system or computer system service may be utilized in the computing resource service provider 1002, such as a computer system or computer system service that does not employ virtualization or instantiation and instead provisions computing resources on dedicated or shared computers/servers and/or other physical devices.

The block-level data storage service 1010 may comprise one or more computing resources that collectively operate to store data for a customer 1004 using block-level storage devices (and/or virtualizations thereof). The block-level storage devices of the block-level data storage service 1010 may, for instance, be operationally attached to virtual computer systems provided by the virtual computer system service 1008 to serve as logical units (e.g., virtual drives) for the computer systems. A block-level storage device may enable the persistent storage of data used/generated by a corresponding virtual computer system where the virtual computer system service 1008 may only provide ephemeral data storage.

The computing resource service provider 1002 also includes a cryptography service 1012. The cryptography service 1012 may utilize one or more storage services of the computing resource service provider 1002 to store keys of the customers in encrypted form, whereby the keys may be usable to decrypt customer 1004 keys accessible only to particular devices of the cryptography service 1012.

The computing resource service provider 1002 further includes an on-demand data storage service 1014. The on-demand data storage service 1014 may be a collection of computing resources configured to synchronously process requests to store and/or access data. The on-demand data storage service 1014 may operate using computing resources (e.g., databases) that enable the on-demand data storage service 1014 to locate and retrieve data quickly, to allow data to be provided in responses to requests for the data. For example, the on-demand data storage service 1014 may maintain stored data in a manner such that, when a request for a data object is retrieved, the data object can be provided (or streaming of the data object can be initiated) in a response to the request. As noted, data stored in the on-demand data storage service 1014 may be organized into data objects. The data objects may have arbitrary sizes except, perhaps, for certain constraints on size. Thus, the on-demand data storage service 1014 may store numerous data objects of varying sizes. The on-demand data storage service 1014 may operate as a key value store that associates data objects with identifiers of the data objects that may be used by the customer 1004 to retrieve or perform other operations in connection with the data objects stored by the on-demand data storage service 1014.

In the environment illustrated in FIG. 10, a notification service 1016 is included. The notification service 1016 may comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1016 may provide notifications to clients using a "push" mechanism without the need to check periodically or "poll" for new information and updates. The notification service 1016 may further be used for various purposes such as monitoring applications executing in the virtual computer system service 1008, workflow systems, time-sensitive information updates, mobile applications, and many others.

As illustrated in FIG. 10, the computing resource service provider 1002, in various embodiments, includes an authentication system 1018 and a policy management service 1020. The authentication system 1018, in an embodiment, is a computer system (i.e., collection of computing resources) configured to perform operations involved in authentication of users of the customer. For instance, one of the services 1008-1016 and 1020-24 may provide information from a user to the authentication system 1018 to receive information in return that indicates whether the user requests are authentic.

The policy management service 1020, in an embodiment, is a computer system configured to manage policies on behalf of customers (such as customer 1004) of the computing resource service provider 1002. The policy management service 1020 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 1002, in various embodiments, is also equipped with a container service 1022. The container service 1022 is configured to create and manage software containers and container instances for the customers 1004 of the computing resource service provider in the manner described for the container service 200 of FIG. 2. The container service 1022 may be configured to use other resources of the computing resource service provider 1002, such as the block-level data storage service 1010. For example, the container service 1022 may allow tasks running within container instances to share one or more specified block-level data storage volumes.

The computing resource service provider 1002 additionally maintains one or more other services 1024 based at least in part on the needs of its customers 1004. For instance, the computing resource service provider 1002 may maintain a database service for its customers 1004. A database service may be a collection of computing resources that collectively operate to run one or more databases for one or more customers 1004. The customer 1004 may operate and manage a database from the database service by utilizing appropriately configured API calls. This, in turn, may allow a customer 1004 to maintain and potentially scale the operations in the database. Other services include, but are not limited to, object-level archival data storage services and services that manage and/or monitor other services.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 11:
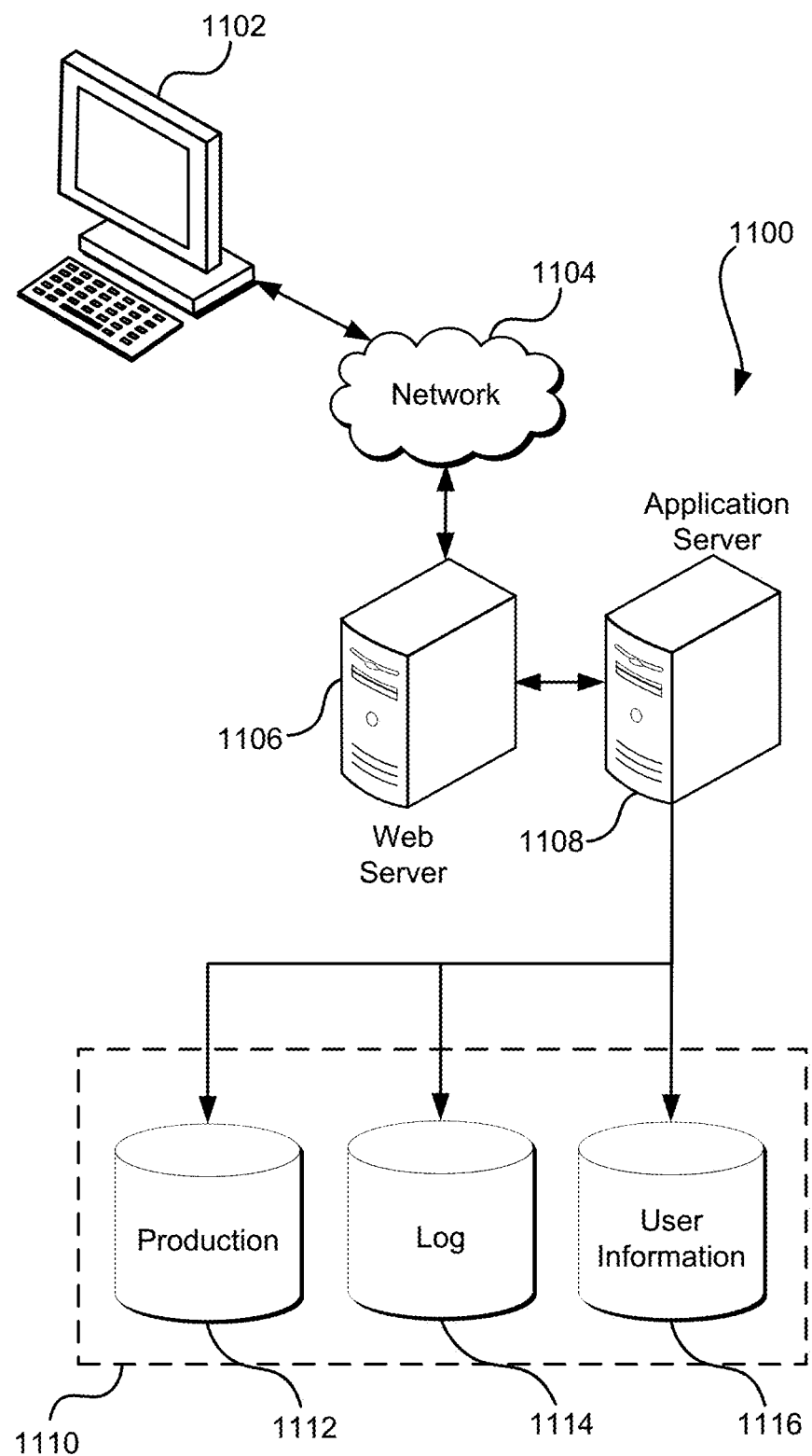
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP:

Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a physical device of a network of physical devices, a request for a companion computer system to be associated with the network of physical devices included in a building;
   in response to the request, instantiating the companion computer system by at least:
      instantiating a virtual machine instance of the companion computer system executed in a container instance, the virtual machine instance communicating building information associated with the network of physical devices to another companion computer system; and
      loading a first component of a first application into memory of the companion computer system, where a second component of the first application is executed by at least one physical device of the network of physical devices;
   receiving, based at least in part on the building information, data from the second component of the first application, where the data is generated by the physical device; and
   performing, by the companion computer system, one or more operations of the first application on the data on behalf of the physical device.

2. The computer-implemented method of claim 1, wherein the computer-implemented method further comprises:
   aggregating data obtained from the network of physical devices to generate aggregated data; and
   determining additional information associated with individuals interactions with the building based at least in part on the aggregated data.

3. The computer-implemented method of claim 2, wherein performing, by the companion computer system, the one or more operations further comprise:
   generate a determination to modify one or more attributes of a subset of physical devices of the network of physical devices based at least in part on the additional information; and
   transmitting a command to the subset of physical devices that, when recited by the subset of physical devices, cause the subset of physical devices to modify the one or more attributes according to the determination.

4. The computer-implemented method of claim 1, wherein performing, by the companion computer system, one or more operations further comprise transmitting a notification to a customer as a result of the data triggering an alarm.

5. A system, comprising:
   one or more processors; and
   memory storing instructions that, as a result of being executed by the one or more processors, cause the system to:
      receive a request to assign a first companion computer system to a set of physical devices associated with a location and connected to a network operated by a computing resource service provider;
      fulfill the request by at least:
      instantiating one or more virtual machine instances to perform one or more operations as the first companion computer system, the one or more virtual machine instances executed within a container and communicating with another companion computer system location information associated with the location of the set of physical devices;
      load a first component of a application onto the first companion computer system, the first component of the application causing the first companion computer system to operate in accordance with an operation of a second component of the application executing on a particular physical device of the set of physical devices; and
      perform, by the first companion computer system, the one or more operations of the first component of the application on data received from the set of physical devices from the location and obtained based at least in part on the operation of the second component of the application.

6. The system of claim 5, wherein the instructions that cause the first companion computer system to perform the one or more operations further include instructions that, as a result of being executed by the one or more processors, cause the system to transmit a command to the particular physical device of the set of physical devices.

7. The system of claim 5, wherein the memory further includes instructions that, as a result of being executed by the one or more processors, cause the first companion computer system to detect an individual in the location based at least in part on information obtained from the set of physical devices.

8. The system of claim 7, wherein the memory further includes instructions that, as a result of being executed by the one or more processors, cause the first companion computer system to transmit a command to the particular physical device of the set of physical devices as a result of detecting the individual.

9. The system of claim 5, wherein the memory further includes instructions that, as a result of being executed by the one or more processors, cause the first companion computer system to receive a command to be transmitted to a subset of physical devices of the set of physical devices through a management console exposed to a customer.

10. The system of claim 5, wherein the memory further includes instructions that, as a result of being executed by the one or more processors, cause the first companion computer system to transmit a command to the set of physical devices based at least in part on a request received from a scheduler responsible for scheduling the operations of the set of physical devices.

11. The system of claim 5, wherein the memory further includes instructions that, as a result of being executed by the one or more processors, cause the first companion computer system to obtain data from one or more sensors of the set of physical devices prior to performing the one or more operations of the first component of the application.

12. The system of claim 5, wherein the one or more operations of the first component of the application processes additional data obtained from a second set of physical devices associated with a second location.

13. One or more non-transitory computer-readable storage media storing thereon executable instructions that, as a result of being executed by one or more processors of a computer system, cause the computer system to at least:
   receive, from a physical device connected to a network of physical devices in a location, a request for a companion computer system to be associated with the network of physical devices; and
   respond to the request by at least:
      instantiating one or more virtual machine instances to perform one or more operations as the companion computer system, the one or more virtual machine instances of the companion computer system executed in a container instance and the one or more virtual machine instances of the companion computer system communicate with another companion computer system about the location associated with the physical device connected to the network of physical devices;
      loading a first component of a first application into memory of the companion computer system, where a second component of the first application is executed by the physical devices;
      obtaining data generated by the physical device based at least in part on information corresponding to the location; and
      causing the one or more virtual machine instances of the companion computer system to perform the one or more operations of the first application on the data on behalf of the physical device.

14. The one or more non-transitory computer-readable storage media of claim 13, wherein the instructions that cause the computer system to receive the request associated with the companion computer system further include instructions that cause the computer system to receive data obtained by the physical device included in the request and provide the data to the companion computer system.

15. The one or more non-transitory computer-readable storage media of claim 13, wherein the instructions further comprise instructions that, as a result of being executed by the one or more processors, cause the computer system to transmit a command to the physical device to change one or more attributes of the physical device as a result of performing the one or more operations of the first application.

16. The one or more non-transitory computer-readable storage media of claim 13, wherein the instructions further comprise instructions that, as a result of executed by the one or more processors, cause the computer system to correlate data obtained from the physical device with data obtained from at least one other physical device connected to the network of physical devices to generate correlated data.

17. The one or more non-transitory computer-readable storage media of claim 16, wherein the instructions further comprise instructions that, as a result of executed by the one or more processors, cause the companion computer system to determine an additional operation to perform based at least in part on the correlated data.

18. The one or more non-transitory computer-readable storage media of claim 13, wherein the instructions further comprise instructions that, as a result of executed by the one or more processors, cause the computer system to provide the data generated by the physical device to another computer system.

19. The one or more non-transitory computer-readable storage media of claim 13, wherein the instructions cause the one or more virtual machine instances of the companion computer system to perform the one or more operations further comprise instructions that, as a result of being executed by the one or more processors, cause the computer system to detect a person at the location based at least in part on the data.

20. The one or more non-transitory computer-readable storage media of claim 19, wherein at least on physical device of the network of physical devices is a sensor.

* * * * *